(12) United States Patent
Hong

(10) Patent No.: US 12,418,887 B2
(45) Date of Patent: Sep. 16, 2025

(54) PAGING METHOD AND APPARATUS, AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 369 days.

(21) Appl. No.: 18/043,778

(22) PCT Filed: Sep. 3, 2020

(86) PCT No.: PCT/CN2020/113267
§ 371 (c)(1),
(2) Date: Mar. 2, 2023

(87) PCT Pub. No.: WO2022/047703
PCT Pub. Date: Mar. 10, 2022

(65) Prior Publication Data
US 2023/0337182 A1    Oct. 19, 2023

(51) Int. Cl.
H04W 68/02    (2009.01)
H04W 8/18     (2009.01)
H04W 88/06    (2009.01)

(52) U.S. Cl.
CPC ........... H04W 68/02 (2013.01); H04W 8/183 (2013.01); *H04W 88/06* (2013.01)

(58) Field of Classification Search
CPC ..... H04W 68/02; H04W 8/183; H04W 88/06; H04W 4/50; H04W 12/45; H04W 76/27
USPC ........................................... 455/458
See application file for complete search history.

(56) References Cited

U.S. PATENT DOCUMENTS

| | | | |
|---|---|---|---|
| 12,114,288 B2 * | 10/2024 | Chen ................ | H04W 76/10 |
| 2020/0196273 A1 | 6/2020 | Ozturk et al. | |
| 2021/0022111 A1 * | 1/2021 | Kumar ............... | H04W 68/02 |
| 2022/0110091 A1 * | 4/2022 | Li ..................... | H04W 76/19 |
| 2022/0225273 A1 * | 7/2022 | Geng ................. | H04W 76/28 |
| 2022/0394666 A1 * | 12/2022 | Gao .................. | H04W 74/0825 |
| 2022/0408402 A1 * | 12/2022 | Liang ................ | H04W 60/005 |

(Continued)

FOREIGN PATENT DOCUMENTS

| | | |
|---|---|---|
| CN | 111263437 A | 6/2020 |
| CN | 111294789 A | 6/2020 |

OTHER PUBLICATIONS

Amendments received before examination dated Nov. 11, 2024 for EP 20951950 (Year: 2024).*

(Continued)

*Primary Examiner* — Juan A Torres
(74) *Attorney, Agent, or Firm* — Finnegan, Henderson, Farabow, Garrett & Dunner, L.L.P.

(57) ABSTRACT

A paging method is performed by a terminal including multiple subscriber identity modules (SIMs), and the method includes: sending target indication information to a core network in response to determining that a paging collision exists at initial paging occasions of the multiple SIMs, wherein the target indication information is configured to indicate that the paging collision exists; receiving a target paging offset value corresponding to a target SIM in the multiple SIMs; and determining, based on the target paging offset value, a target paging occasion for receiving by the target SIM a paging message.

6 Claims, 12 Drawing Sheets

(56) References Cited

U.S. PATENT DOCUMENTS

2023/0189209 A1* 6/2023 Jung ............... H04W 76/28
370/329
2023/0300787 A1* 9/2023 Phan ............... H04W 68/005
455/458

OTHER PUBLICATIONS

Amended claims with annotations filed after receipt of (European) search report dated Nov. 11, 2024 for EP 20951950 (Year: 2024).*
International Search Report and Written Opinion of International Application No. PCT/CN2020/113267, dated Apr. 28, 2021, 15 pages.
Ericsson, "Paging collision avoidance", 3GPP TSG-RAN WG2 #111e, Tdoc R2-2007603, Electronic meeting, Aug. 17-28, 2020, 5 pages.
Qualcomm Incorporated, Oppo, China Unicom, Vivo, "Avoidance of paging collisions to minimize outage of services", SA WG2 Meeting #122, S2-174243, Jun. 26-30, 2017, San Jose Del Cabo, Mexico, 8 pages.
Qualcomm Incorporated, apple, vivo, CATT, "Solution for paging collision avoidance", SA WG2 Meeting #139E, S2-2003894, Jun. 1-12, 2020, Elbonia, 5 pages.
Extended European Search Report issued in Application No. 20951950.3 dated Apr. 29, 2024, 14 pages.

* cited by examiner

PAGING METHOD AND APPARATUS, AND STORAGE MEDIUM

CROSS-REFERENCE TO RELATED APPLICATION

This application is a national phase of International Application No. PCT/CN2020/113267, filed on Sep. 3, 2020, the entire content of which is incorporated herein by reference.

TECHNICAL FIELD

The disclosure relates to the communication field, and particularly to, a paging method, a paging apparatus, and a storage medium.

BACKGROUND

Multi-subscriber-identity-module (multi-SIM) mobile phones are increasing on the market as wireless communication technologies developed. At present, manners for processing multi-SIM mobile phones are achieved mainly by various terminal manufacturers, which results in many different terminal behaviors and processing manners such as dual-SIM single-standby, dual-SIM dual-standby single-pass and dual-SIM dual-standby dual-pass, and may cause some problems. For example, a collision may occur at paging occasions of different SIMs of the same terminal, so that the multi-SIM terminal may not receive or misses a paging message, thereby causing that a service is unable to be established.

SUMMARY

According to a first aspect of embodiments of the disclosure, a paging method is provided. The method is applicable to a terminal including multiple SIMs. The method includes: sending target indication information to a core network in response to determining that a paging collision exists at initial paging occasions of the multiple SIMs; in which the target indication information is configured to indicate that the paging collision exists; receiving a target paging offset value corresponding to a target SIM in the multiple SIMs; and determining, based on the target paging offset value, a target paging occasion for receiving by the target SIM a paging message.

According to a second aspect of embodiments of the disclosure, a paging method is provided. The method is applicable to a core network. The method includes: determining a target paging offset value corresponding to a target SIM in multiple SIMs, in response to receiving target indication information reported by a terminal including the multiple SIMs; in which the target indication information is configured to indicate that a paging collision exists; and sending the target paging offset value.

According to a third aspect of embodiments of the disclosure, a paging method is provided. The method is applicable to a first base station. The method includes: receiving a first paging message from a core network for paging a target SIM, in which the first paging message includes a target paging offset value corresponding to the target SIM.

According to a fourth aspect of embodiments of the disclosure, a paging method is provided. The method is applicable to a second base station. The method includes: receiving a second paging message from a first base station for paging a target SIM, in which the second paging message includes a target paging offset value corresponding to the target SIM; determining a target paging occasion corresponding to the target SIM based on the target paging offset value; and sending a paging message to the target SIM in response to reaching the target paging occasion.

According to a fifth aspect of embodiments of the disclosure, a computer-readable storage medium with a computer program stored thereon is provided, in which the computer program is configured to perform the paging method described in the first aspect.

According to a sixth aspect of embodiments of the disclosure, a computer-readable storage medium with a computer program stored thereon is provided, in which the computer program is configured to perform the paging method described in any one of the second aspect.

According to a seventh aspect of embodiments of the disclosure, a computer-readable storage medium with a computer program stored thereon is provided, in which the computer program is configured to perform the paging method described in any one of the third aspect or the fourth aspect.

According to an eighth aspect of embodiments of the disclosure, a paging device is provided and includes: a processor; and a memory configured to store instructions executable by, the processor; in which the processor is configured to perform the paging method described in the first aspect.

According to a ninth aspect of embodiments of the disclosure, a paging device is provided and includes: a processor; and a memory configured to store instructions executable by the processor; in which the processor is configured to perform the paging method described in any one of the second aspect.

According to a tenth aspect of embodiments of the disclosure, a paging device is provided, and includes: a processor; and a memory configured to store instructions executable by the processor; in which the processor is configured to perform the paging method described in any one of the third aspect or the fourth aspect.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
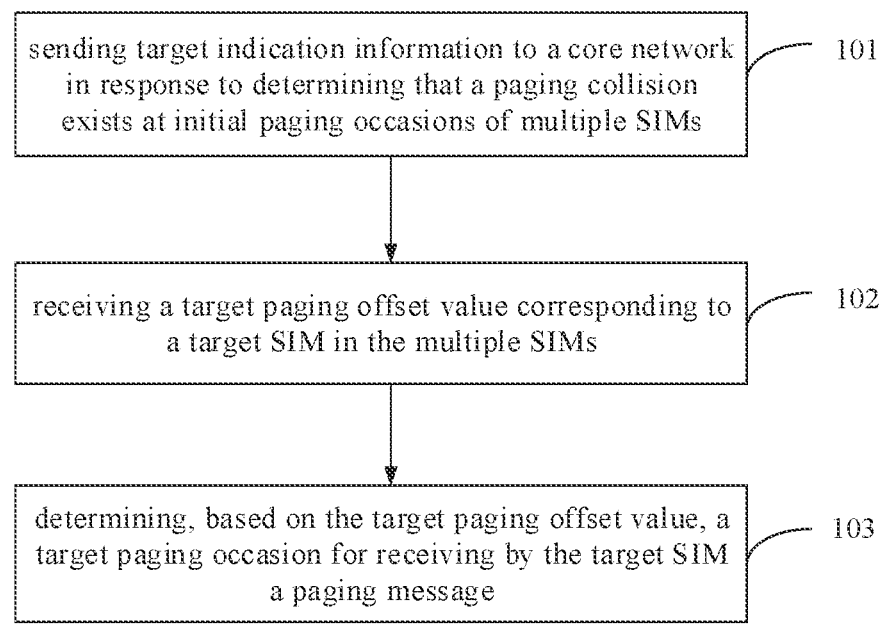
FIG. 1 is a flowchart illustrating a paging method according to some embodiments.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a", "said" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used in this disclosure to describe various information, the information should not be limited to these terms. These terms are only used to distinguish the same type of information from each other. For example, without departing from the scope of the disclosure, the instruction information may also be referred to as the second information, and similarly, the second information may also be referred to as the instruction information. Depending on the context, the word "if" as used herein can be interpreted as "when", "while" or "in response to determining".

The paging solutions provided in the disclosure may be for a terminal that includes multiple SIMs and is in an inactive state.

A new radio resource control (RRC) state is introduced into a 5th-generation (5G) new radio (NR) technology, that is, an RRC_INACTIVE state, i.e. an RRC inactive (non-activated) state. When the terminal is in the above state, a non-access stratum (NAS) of the terminal remains a connected state, that is, a connection between the terminal and a core network is maintained. However, an NR connection of the terminal is disconnected, and a base station side retains contextual information of the terminal and a NG interface connection between the terminal and the core network. The NG interface is an interface between a radio access network and a 5G core network.

The terminal in the inactive state may move within an area range configured by the base station without notifying the network, to save a signaling overhead. When the terminal enters the inactive state, a last serving base station stores context of the terminal and maintains the NG interface connection with a serving core network, and an access stratum (AS) of the terminal also stores corresponding contextual information, including a load, an identifier of the inactive state, and a home area. The base station may page the terminal in the inactive state through a radio access network paging mechanism in the configured area range, and the terminal may quickly resume data transmission based on contextual information stored on the terminal side and the base station side, to achieve the low-latency transmission.

A paging method provided in the disclosure may be introduced for a terminal including multiple SIMs and in an inactive state.

A paging method is provided in embodiments of the disclosure. The method is applicable to a terminal including multiple SIMs and in an inactive state. As illustrated in FIG. 1, FIG. 1 is a flowchart illustrating a paging method according to some embodiments. The method may include the following steps.

At step 101, target indication information is sent to a core network in response to determining that a paging collision exists at initial paging occasions of the multiple SIMs.

In embodiments of the disclosure, when the terminal determines that initial paging occasions of at least two SIMs in the multiple SIMs are the same, it may be determined that the paging collision exists. In addition, when the terminal determines that an interval between initial paging occasions of at least two SIMs in the multiple SIMs is less than a certain threshold, it may be determined that the paging collision exists. The terminal may send the target indication information to the core network. The target indication information is configured to indicate that the paging collision exists.

In an example, the terminal may send the target indication information to the core network by means of a first signaling. The first signaling may include but not limited to a MobilityRegistration signaling or a tracking area update (TAU) Request signaling.

In embodiments of the disclosure, the target indication information is sent by the terminal to the core network through a first base station. The first base station may be a last base station for serving the terminal before the terminal is switched to the inactive state.

At step 102, a target paging offset value corresponding to a target SIM in the multiple SIMs is received.

In embodiments of the disclosure, the core network may determine the target paging offset value corresponding to the target SIM in the multiple SIMs when receiving the target indication information. The target SIM is any one of the multiple SIMs, which has the paging collision with other SIMs. The core network may determine the corresponding target paging offset value for one or more target SIMs. The core network may send the target paging offset value to the terminal through the first base station, and the terminal receives it.

In an example, the terminal may determine the target offset value through the received second signaling. The second signaling includes but not limited to a MobilityRegistration signaling or a TAU Accept signaling.

At step 103, a target paging occasion for receiving by the target SIM a paging message is determined based on the target paging offset value.

In embodiments of the disclosure, it is assumed that if an identifier of the target SIM is set to a preset module value to obtain a residual value d1, and a number of time units corresponding to the target paging offset value is n, d2=d1+n is obtained and the time unit(s) corresponding to d2 is taken as the target paging occasion. The above time unit may be but not limited to taking a slot as a unit.

In the above embodiments, the terminal including the multiple SIMs may send the target indication information to the core network in response to determining that the paging collision exists at the initial paging occasions of the multiple SIMs, and inform the core network that the paging collision exists, and the core network may determine the target paging offset value corresponding to the target SIM in the multiple SIMs based on the target indication information, and the terminal may determine, based on the target paging offset value, the target paging occasion for receiving by the target SIM the paging message, so that the paging message may be received at the target paging occasion, thereby avoiding that the paging collision exists among the multiple SIMs on the same terminal and having the high availability.

Figure 2:
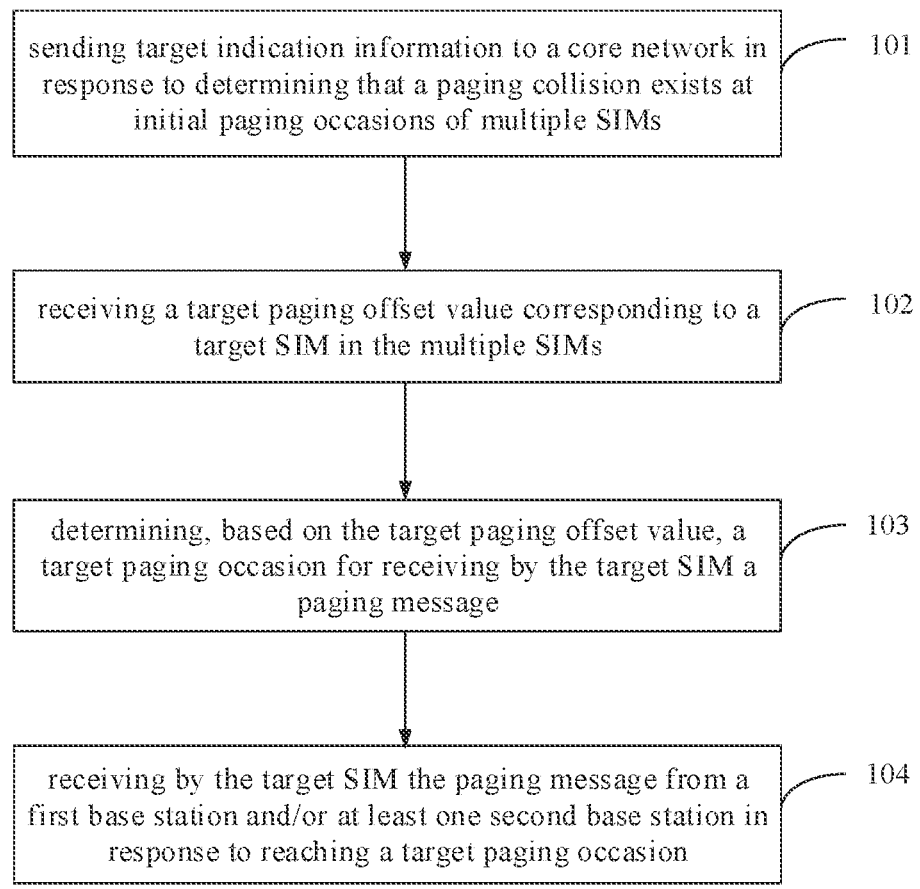
FIG. 2 is a flowchart illustrating another paging method according to some embodiments.

In some optional embodiments, as illustrated in FIG. 2, FIG. 2 is a flowchart illustrating another paging method according to embodiments as illustrated in FIG. 1. The method further includes the following step.

At step 104, the target SIM receives the paging message from a first base station and/or at least one second base station in response to reaching the target paging occasion.

In embodiments of the disclosure, the first base station is a last base station for serving the terminal before the terminal is switched to the inactive state, that is, the base station that retains contextual information of the terminal and maintains the NG interface connection with the core network. The at least one second base station is a base station in a radio access network (RAN) notification area located by the target SIM.

For example, neighbor base stations of the first base station include a base station 1, a base station 2, and a base station 3. The base stations 2 and 3 are in the RNA located by the target SIM, and the base stations 2 and 3 may be taken as the second base stations.

In order to ensure that the terminal may be paged, the paging message is sent to the target SIM of the terminal by the first base station and/or the at least one second base station in response to reaching the target paging occasion, and the target SIM may receive the paging message at the target paging occasion.

In the above embodiments, the paging collision among the multiple SIMs on the same terminal may be avoided while ensuring that the target SIM is paged.

A paging method provided in the disclosure may be introduced from a core network side.

Figure 3:
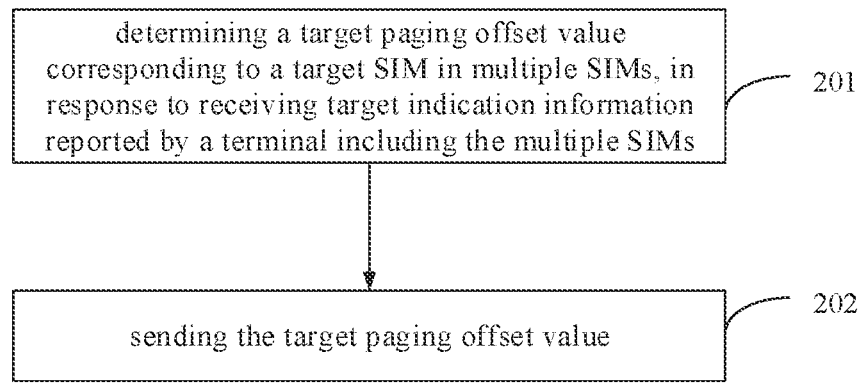
FIG. 3 is a flowchart illustrating another paging method according to some embodiments.

Another paging method is provided in embodiments of the disclosure. The method is applicable to a core network. As illustrated in FIG. 3, FIG. 3 is a flowchart illustrating another paging method according to some embodiments. The method may include the following steps.

At step 201, a target paging offset value corresponding to a target SIM in multiple SIMs is determined, in response to receiving target indication information reported by a terminal including the multiple SIMs.

In embodiments of the disclosure, the target indication information is configured to indicate that a paging collision exists. The core network may determine the target paging offset corresponding to the target SIM in the multiple SIMs in response to receiving the target indication information.

In an example, the core network may receive the target indication information reported by the terminal by means of a first signaling. The first signaling includes but not limited to a MobilityRegistration signaling or a TAU Request signaling.

In another example, the core network may randomly determine the target paging offset value for the target SIM, and the target paging offset value may indicate a number of time units shifted by a target paging occasion for the target SIM, for example, 0, 1, 2, 3 or other natural number.

At step 202, the target paging offset value is sent.

In an example, the core network may send the target paging offset value by means of a second signaling. The second signaling may include but not limited to a MobilityRegistration signaling or a TAU Accept signaling.

In the above embodiments, the core network may determine the target paging offset value corresponding to the target SIM in multiple SIMs and send the target paging offset value, in response to receiving the target indication information reported by the terminal including the multiple SIMs, and the terminal may determine, based on the target paging offset value, the target paging occasion for receiving by the target SIM the paging message. The paging collision among the multiple SIMs on the same terminal may be avoided, which has the high availability.

Figure 4:
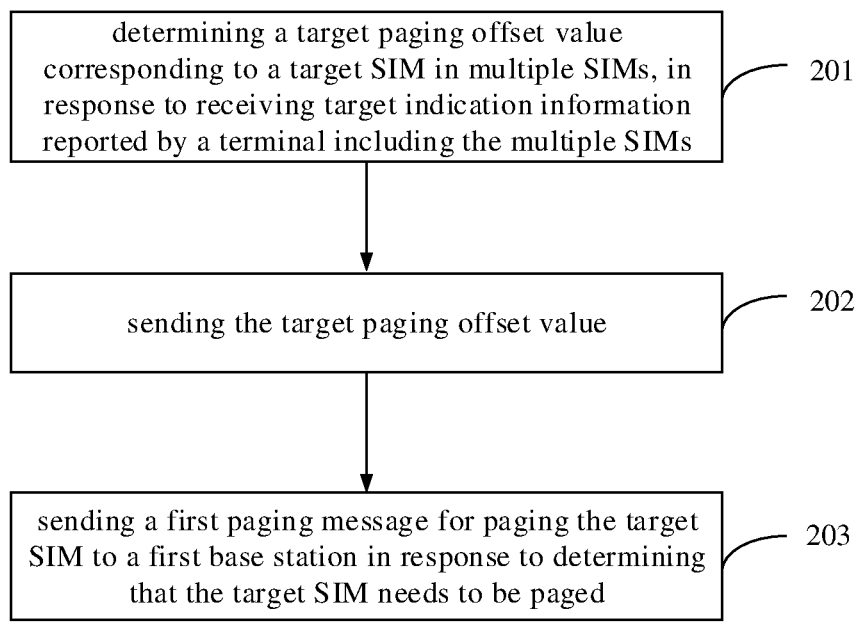
FIG. 4 is a flowchart illustrating another paging method according to some embodiments.

In some optional embodiments, as illustrated in FIG. 4, FIG. 4 is a flowchart illustrating another paging method according to embodiments as illustrated in FIG. 3. The method further includes the following step.

At step 203, a first paging message for paging the target SIM is sent to a first base station in response to determining that the target SIM needs to be paged.

In embodiments of the disclosure, the first paging message includes the target paging offset value, and the first base station is a last base station for serving the terminal before the terminal is switched to an inactive state, that is, an anchor base station that retains contextual information of the terminal and maintains an NG interface connection with the core network.

The first base station as the anchor base station may determine the target paging occasion based on the target paging offset value when receiving the first paging message, thereby sending the paging message to the target SIM. Optionally, the first base station may send a second paging message to at least one second base station in response to determining that there is at least one second base station in a RAN-based notification area located by the target SIM, so that the second base station may determine the target paging occasion based on the target paging offset value, and send the paging message to the target SIM in response to reaching the target paging occasion. The first base station and the at least one second base station may determine the target paging occasion based on the target paging offset value, and send the paging message to the target SIM in response to reaching the target paging occasion, thereby paging the terminal including the multiple SIMs and in the inactive state.

In an example, the first paging message may adopt a PAGING message.

In embodiments of the disclosure, the core network may send the first paging message including the target paging offset value to the first base station in response to determining that the target SIM needs to be paged; in which the first base station is the last base station for serving the terminal before the terminal is switched to the inactive state. The first base station may determine the target paging occasion based on the target paging offset value, and send the paging message to the target SIM at the target paging occasion, which the paging collision among the multiple SIMs on the same terminal.

In some optional embodiments, the first paging message may include a first information element (IE) configured to indicate the target paging offset value. The first information element may be an information element (IE) newly added in the first paging message.

In an example, the first paging message may adopt a PAGING message. The PAGING message is a message sent by an AuthenticationManagementFunction (AMF), and configured to page the terminal in one or more tracking areas.

In embodiments of the disclosure, the PAGING message is sent by the core network to the first base station.

In another example, the first information element configured to indicate the target paging offset value may be added in a PAGING message as illustrated in Table 1.

TABLE 1

| Information Element Name | Presence Indication | Range | Information Element Type and Reference Information | Semantic Description | Criticality | Allocation Criticality |
|---|---|---|---|---|---|---|
| Message Type | M | | 9.3.1.1 | | YES | Ignore |
| . . . | . . . | . . . | . . . | . . . | . . . | . . . |
| Target Offset Value (UE-offset) | O | | x.x.x.x | | YES | ignore |

Or, in embodiments of the disclosure, a third information element configured to indicate the target paging offset value is newly added in a second information element included in the first paging message.

In an example, the second information element includes but not limited to an Assistance Data for Paging IE.

In the above embodiments, the target paging offset value is indicated by the first information element or the third information element included in the first paging message, with the simple implementation and high availability.

A paging method provided in the disclosure may be introduced from a first base station side.

Another paging method is provided in embodiments of the disclosure. The method is applicable to a first base station. The first base station is a last base station for serving the terminal before the terminal is switched to an inactive state, that is, an anchor base station. The method may include the following steps.

At step 301, a first paging message from a core network for paging a target SIM is received.

The first paging message includes a target paging offset value corresponding to the target SIM.

Figure 5:
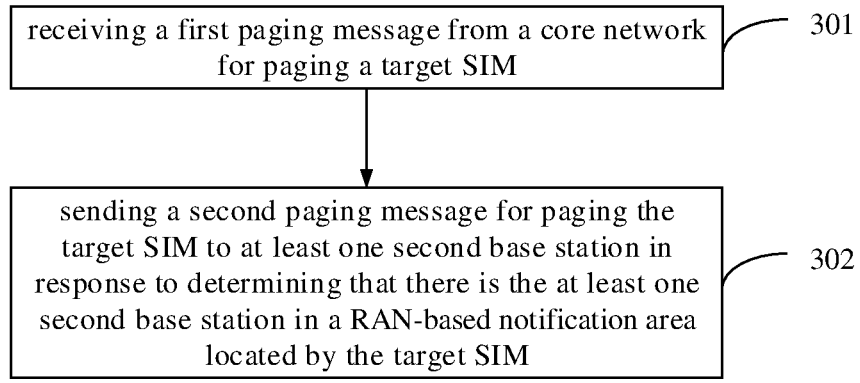
FIG. 5 is a flowchart illustrating another paging method according to some embodiments.

In some optional embodiments, as illustrated in FIG. 5, FIG. 5 is a flowchart illustrating another paging method according to some embodiments. The method further may include the following step.

At step 302, a second paging message for paging the target SIM is sent to at least one second base station in response to determining that there is the at least one second base station in a RAN-based notification area located by the target SIM.

In embodiments of the disclosure, the second paging message includes the target paging offset value corresponding to the target SIM.

In the above embodiments, the first base station may receive the first paging message from the core network for paging the target SIM, and the first paging message includes the target paging offset value corresponding to the target SIM. The second paging message is sent to at least one second base station in response to determining that there is at least one second base station in the RAN-based notification area located by the target SIM, and the second paging message includes the target paging offset value. The first base station and the at least one second base station may send the paging message to the target SIM in response to reaching the target paging occasion. Similarly, the paging collision among the multiple SIMs on the same terminal may be avoided.

Figure 6:
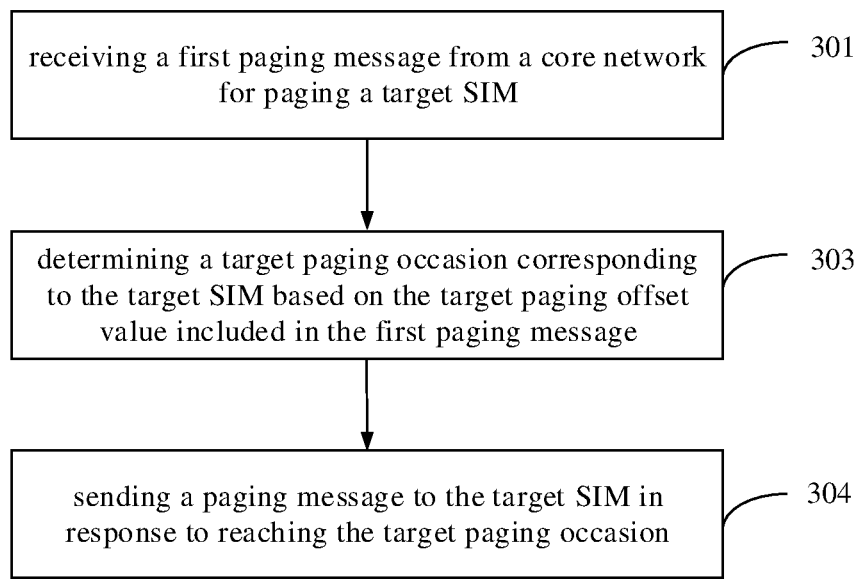
FIG. 6 is a flowchart illustrating another paging method according to some embodiments.

In some optional embodiments, as illustrated in FIG. 6, FIG. 6 is a flowchart illustrating another paging method according to some embodiments. The above method further includes the following steps.

At step 303, a target paging occasion corresponding to the target SIM is determined based on the target paging offset value included in the first paging message.

In embodiments of the disclosure, whether the second base station exists, the target paging occasion may be determined by the first base station as the anchor base station based on the target paging offset value included in the first paging message, further to send the paging message to the target SIM. The method for determining by the first base station the target paging occasion is same as the method for determining the target paging occasion at the terminal side, which will not be repeated herein.

At step 304, a paging message is sent to the target SIM in response to reaching the target paging occasion.

In the above embodiments, whether the second base station exists, the first base station as the anchor base station may determine the target paging occasion for paging the target SIM based on the target paging offset value included in the first paging message sent by the core network, and send the paging message to the target SIM in response to reaching the target paging offset value. The paging collision among the multiple SIMS on the same terminal may be avoided, with the high availability.

In some optional embodiments, the first paging message may adopt a PAGING message. The PAGING message is a message sent by an AMF and configured to page the terminal in one or more tracking areas. In embodiments of the disclosure, the PAGING message is sent by the core network to the first base station.

In another example, the first information element configured to indicate the target paging offset value may be added in a PAGING message as illustrated in Table 1, or, in embodiments of the disclosure, a third information element configured to indicate the target paging offset value is newly added in a second information element included in the first paging message.

In another example, the second information element includes but not limited to an Assistance Data for Paging IE.

In the above embodiments, the first base station may determine the target paging occasion based on the first information element or the third information element in the first paging message sent by the core network, thereby determining the target paging occasion, and send the paging message to the target SIM in response to reaching the target paging occasion, which avoids the paging collision among multiple SIMs on the same terminal.

In some optional embodiments, the second paging message may adopt but not limited to a RAN PAGING message. The message is sent by the first base station to at least one second base station. The at least one second base station is a base station in a RAN notification area located by the target SIM.

In an example, a fourth information element configured to indicate the target paging offset value is newly added in the second paging message.

In another example, a fourth information element may be added in a RAN PAGING message as illustrated in Table 2.

TABLE 2

| Information Element Name | Presence Indication | Range | Information Element Type and Reference Information | Semantic Description | Criticality | Allocation Criticality |
|---|---|---|---|---|---|---|
| Message Type | M | | 9.2.3.1 | | YES | reject |
| ... | ... | ... | ... | ... | ... | ... |
| Target Offset Value (UE-offset) | O | | x.x.x.x | | YES | ignore |

In another example, the second paging message includes a fifth information element, and a sixth information element configured to indicate the target paging offset value may be newly added in the fifth information element. The fifth information element includes but not limited to an Assistance Data for RAN Paging IE.

In the above embodiments, the first base station may indicate the target paging offset value through the fourth information element included in the second paging message, or may indicate the target paging offset value through the sixth information element newly added in the fifth information element included in the second paging message, thereby informing the target paging offset value to the at least one second base station, so that the second base station may page the target SIM in response to reaching the target paging occasion. The paging collision among multiple SIMs on the same terminal may be avoided while ensuring that the target SIM is paged.

A paging method provided in the disclosure may be introduced from a second base station side.

Figure 7:
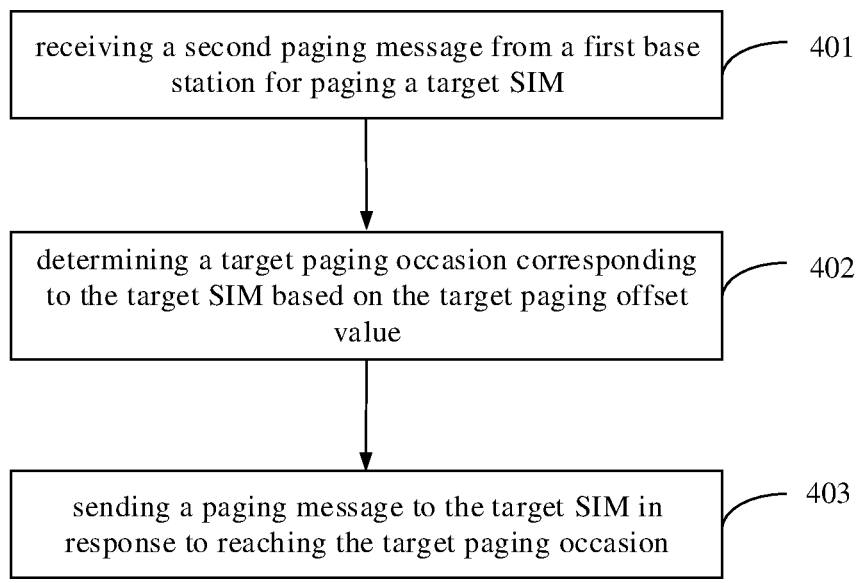
FIG. 7 is a flowchart illustrating another paging method according to some embodiments.

Another paging method is provided in embodiments of the disclosure. The method is applicable to a second base station, that is, a base station in an RNA located by a target SIM. As illustrated in FIG. 7, FIG. 7 is a flowchart illustrating another paging method according to some embodiments. The method may include following steps.

At step 401, a second paging message from a first base station for paging a target SIM is received.

The second paging message includes a target paging offset value corresponding to the target SIM. In an example, the second paging message may be a RAN PAGING message, and include a fourth information element configured to indicate the target paging offset value as illustrated in Table 2. In another example, a sixth information element configured to indicate the target paging offset value may be newly added in a fifth information element included in the second paging message.

At step 402, a target paging occasion corresponding to e target SIM is determined based on the target paging offset value.

In embodiments of the disclosure, the method for determining by the second base station the target paging occasion is same as the method for determining the target paging occasion at the terminal side, which will not be repeated herein.

At step 403, a paging message is sent to the target SIM in response to reaching the target paging occasion.

In the above embodiments, the second base station may determine the target paging occasion based on the target paging offset value included in the second paging message when receiving the second paging message sent by the first base station, and send the paging message to the target SIM in response to reaching the target paging occasion, which avoids the paging collision among multiple SIMs on the same terminal while ensuring that the target SIM is paged.

Figure 8:
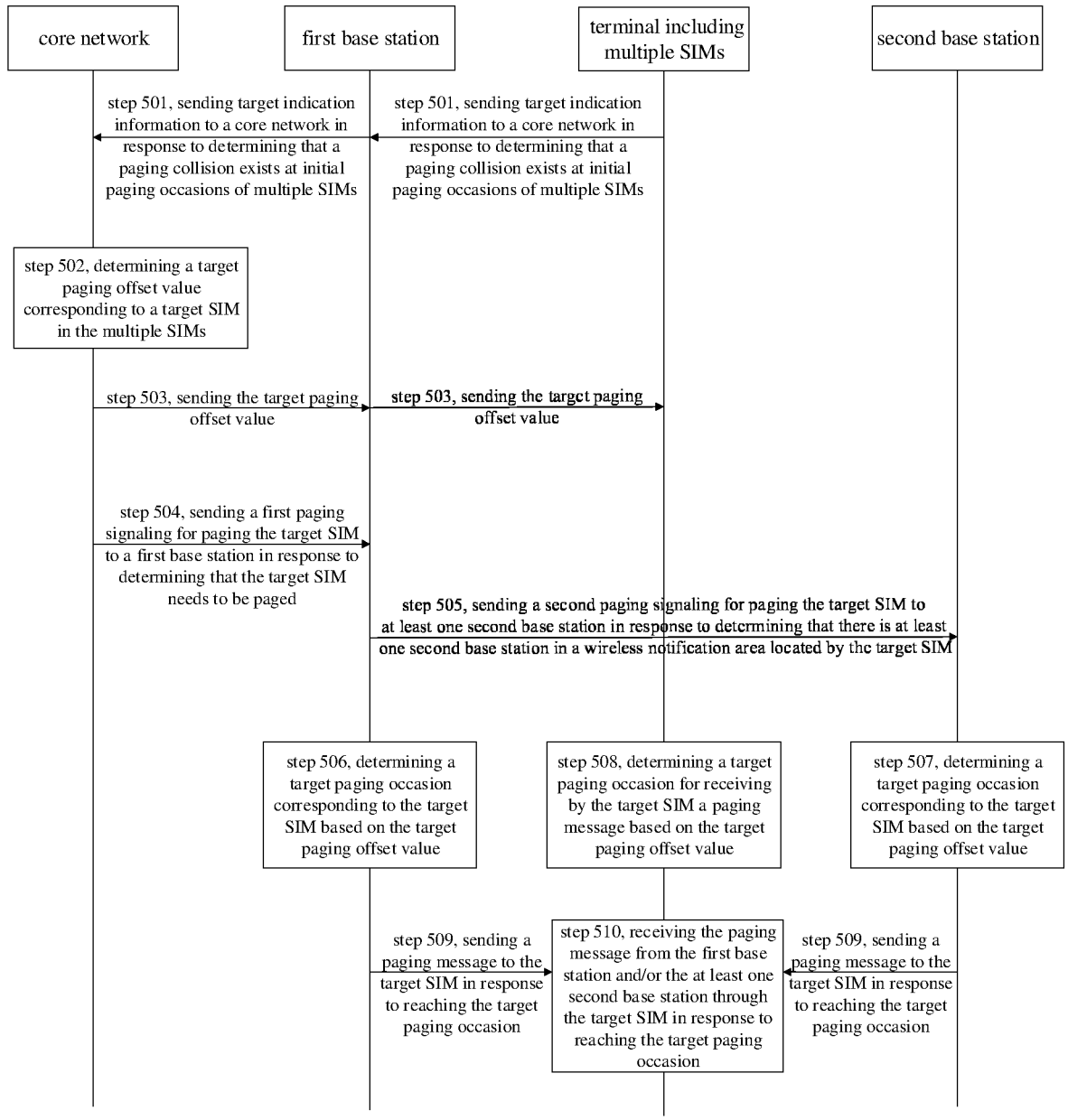
FIG. 8 is a flowchart illustrating another paging method according to some embodiments.

In some optional embodiments, as illustrated in FIG. 8, FIG. 8 is a flowchart illustrating another paging method according to some embodiments. FIG. 8 illustrates by taking there being a second base station in the RNA located by the target SIM. In actual applications, there may be no second base station or more second base stations. The method may include the following steps.

At step 501, target indication information is sent to the core network in response to the terminal including multiple SIMs determining that a paging collision exists at initial paging occasions of the multiple SIMs.

In embodiments of the disclosure, the terminal is in an inactive state, and the terminal may send the target indication information to the core network by means of a first signaling.

At step 502, the core network determines a target paging offset value corresponding to a target SIM in the multiple SIMs.

At step 503, the core network sends the target paging offset value.

In embodiments of the disclosure, the core network may send the target paging offset value by means of a second signaling.

At step 504, the core network sends a first paging message for paging the target SIM to the first base station in response to determining that the target SIM needs to be paged.

The first paging message includes the target paging offset value, and the first base station is a last base station for serving the terminal before the terminal is switched to the inactive state.

At step 505, the first base station sends a second paging message for paging the target SIM to at least one second base station in response to determining that there is at least one second base station in a RAN-based notification area located by the target SIM.

The second paging message includes the target paging offset value.

At step 506, the first base station determines a target paging occasion corresponding to the target SIM based on the target paging offset value.

At step 507, the second base station determines a target paging occasion corresponding to the target SIM based on the target paging offset value.

At step 508, the terminal determines a target paging occasion for receiving by the target SIM a paging message based on the target paging offset value.

At step 509, the first base station and the second base station send a paging message to the target SIM in response to reaching the target paging occasion.

At step 510, the terminal receives the paging message from the first base station and/or the at least one second base station through the target SIM in response to reaching the target paging occasion.

In the above embodiments, the terminal including the multiple SIMs determines, based on the target paging occasion from the core network, the target paging occasion for receiving by the target SIM the paging message, and the terminal receives the paging message from the first base station and/or the at least one second base station through the target SIM in response to reaching the target paging occasion. The first base station may receive the first paging message from the core network, which includes the target paging offset value. The first base station as the anchor base station, determines the target paging occasion based on the target paging offset value included in the first paging message, thereby sending the paging message to the target SIM. In addition, the first base station further may send the target paging offset value to the at least one second base station by means of the second paging message. The first base station and the second base station may send the paging message to the target SIM of the terminal based on the determined target paging occasion. The above process avoids the paging collision among multiple SIMs on the same terminal.

The disclosure further provides apparatus embodiments for achieving an application function corresponding to method embodiments for achieving an application function.

Figure 9:
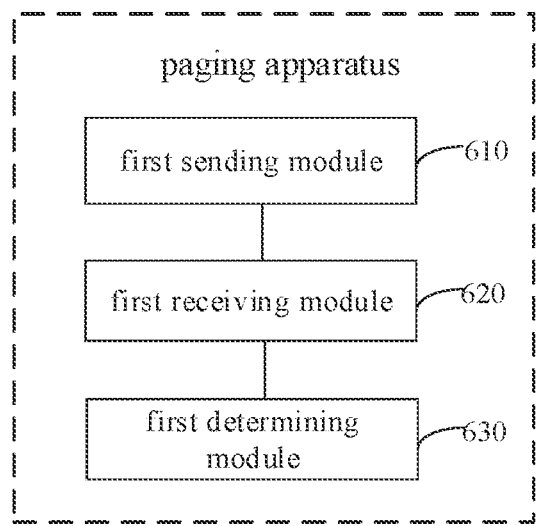
FIG. 9 is a block diagram illustrating a paging apparatus according to some embodiments.

FIG. 9 is a block diagram illustrating a paging apparatus according to some embodiments. The apparatus is applicable to a terminal including multiple SIMs. The apparatus includes a first sending module 610, a first receiving module 620, and a first determining module 630.

The first sending module 610 is configured to send target indication information to a core network in response to determining that a paging collision exists at initial paging occasions of the multiple SIMs; the target indication information is configured to indicate that the paging collision exists.

The first receiving module 620 is configured to receive a target paging offset value corresponding to a target SIM in the multiple SIMs.

The first determining module 630 is configured to determine, based on the target paging offset value, a target paging occasion for receiving by the target SIM a paging message.

Optionally, the apparatus further includes a second receiving module.

The second receiving module is configured to receive, by the target SIM, the paging message from a first base station and/or at least one second base station in response to reaching the target paging occasion; in which the first base station is a last base station for serving the terminal before the terminal is switched to an inactive state, and the at least one second base station is a base station in a RAN-based notification area located by the target SIM.

Figure 10:
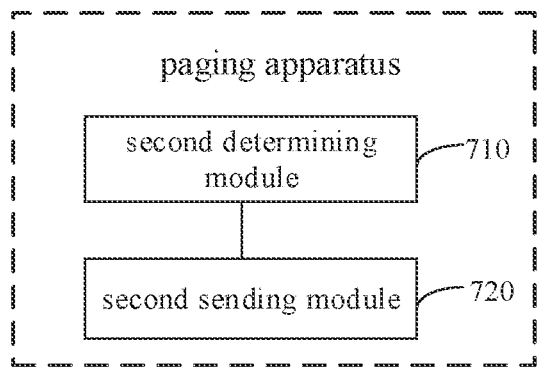
FIG. 10 is a block diagram illustrating another paging apparatus according to some embodiments.

FIG. 10 is a block diagram illustrating another paging apparatus according to some embodiments. The apparatus is applicable to a core network. The apparatus includes a second determining module 710 and a second sending module 720.

The second determining module 710 is configured to determine a target paging offset value corresponding to a target SIM in multiple SIMs, in response to receiving target indication information reported by a terminal including the multiple SIMs; the target indication information is configured to indicate that a paging collision exists.

The second sending module 720 is configured to send the target paging offset value.

Optionally, the apparatus further includes a third sending module.

The third sending module is configured to send a first paging message for paging the target SIM to a first base station in response to determining that the target SIM needs to be paged; in which the first paging message includes the target paging offset value, and the first base station is a last base station for serving the terminal before the terminal is switched to an inactive state.

Optionally, the first paging message includes a first information element for indicating the target paging offset value; or the first paging message includes a second information element, and the second information element includes a third information element for indicating the target paging offset value.

Figure 11:
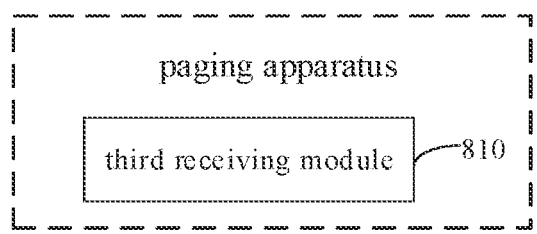
FIG. 11 is a block diagram illustrating another paging apparatus according to some embodiments.

FIG. 11 is a block diagram illustrating another paging apparatus according to some embodiments. The apparatus is applicable to a first base station. The apparatus includes a third receiving module 810.

The third receiving module 810 is configured to receive a first paging message from a core network for paging a target SIM, and the first paging message includes a target paging offset value corresponding to the target SIM.

Optionally, the apparatus further includes a fourth sending module.

The fourth sending module (not shown) is configured to send a second paging message for paging the target SIM to at least one second base station in response to determining that there is at least one second base station in a RAN-based notification area located by the target SIM; the second paging message includes the target paging offset value corresponding to the target SIM.

Optionally, the apparatus further includes a third determining module and a fifth sending module.

The third determining module is configured to determine a target paging occasion corresponding to the target SIM based on the target paging offset value included in the first paging message.

The fifth sending module is configured to send a paging message to the target SIM in response to reaching the target paging occasion.

Optionally, the first paging message includes a first information element for indicating the target paging offset value; or the first paging message includes a second information element, and the second information element includes a third information element for indicating the target paging offset value.

Optionally, the second paging message includes a fourth information element for indicating the target paging offset value; or the second paging message includes a fifth information element, and the fifth information element includes a sixth information element for indicating the target paging offset value.

Figure 12:
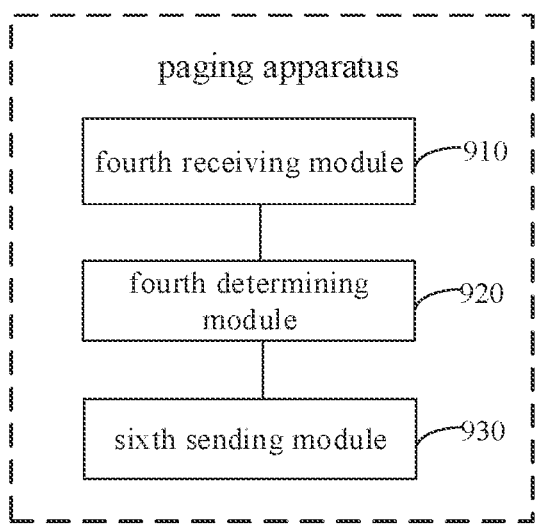
FIG. 12 is a block diagram illustrating another paging apparatus according to some embodiments.

FIG. 12 is a block diagram illustrating another paging apparatus according to some embodiments. The apparatus is applicable to a second base station. The apparatus includes a fourth receiving module 910, a fourth determining module 920, and a sixth sending module 930.

The fourth receiving module 910 is configured to receive a second paging message from a first base station for paging a target SIM, and the second paging message includes a target paging offset value corresponding to the target SIM.

The fourth determining module 920 is configured to determine a target paging occasion corresponding to the target SIM based on the target paging offset value.

The sixth sending module 930 is configured to send a paging message to the target SIM in response to reaching the target paging occasion.

Optionally, the second paging message includes a fourth information element for indicating the target paging offset value; or the second paging message includes a fifth information element, and the fifth information element includes a sixth information element for indicating the target paging offset value.

The apparatus embodiments refer to part descriptions of the method embodiments since they correspond to the method embodiments. The apparatus embodiments described above are only schematic, in which the above units described as separate parts may or may not be physically separated, and the parts shown as units may or may not be physical units, which may be located in one place, or may be distributed to multiple network units. Some or all modules may be selected according to the actual requirements to achieve the purpose of the disclosure. Those skilled in the art may understand and implement it without any creative effort.

Accordingly, a computer-readable storage medium with a computer program stored thereon is provided in the disclosure. The computer program is configured to perform the any paging method at the terminal side including multiple SIMs.

Accordingly, a computer-readable storage medium with a computer program stored thereon is provided in the disclosure. The computer program is configured to perform the any paging method at the core network side.

Accordingly, a computer-readable storage medium with a computer program stored thereon is provided in the disclosure. The computer program is configured to perform the any paging method at the base station side.

Accordingly, a paging device is further provided in the disclosure, and includes: a processor; and a memory configured to store instructions executable by the processor; in which the processor is configured to perform the any paging method at the terminal side including multiple SIMs.

Figure 13:
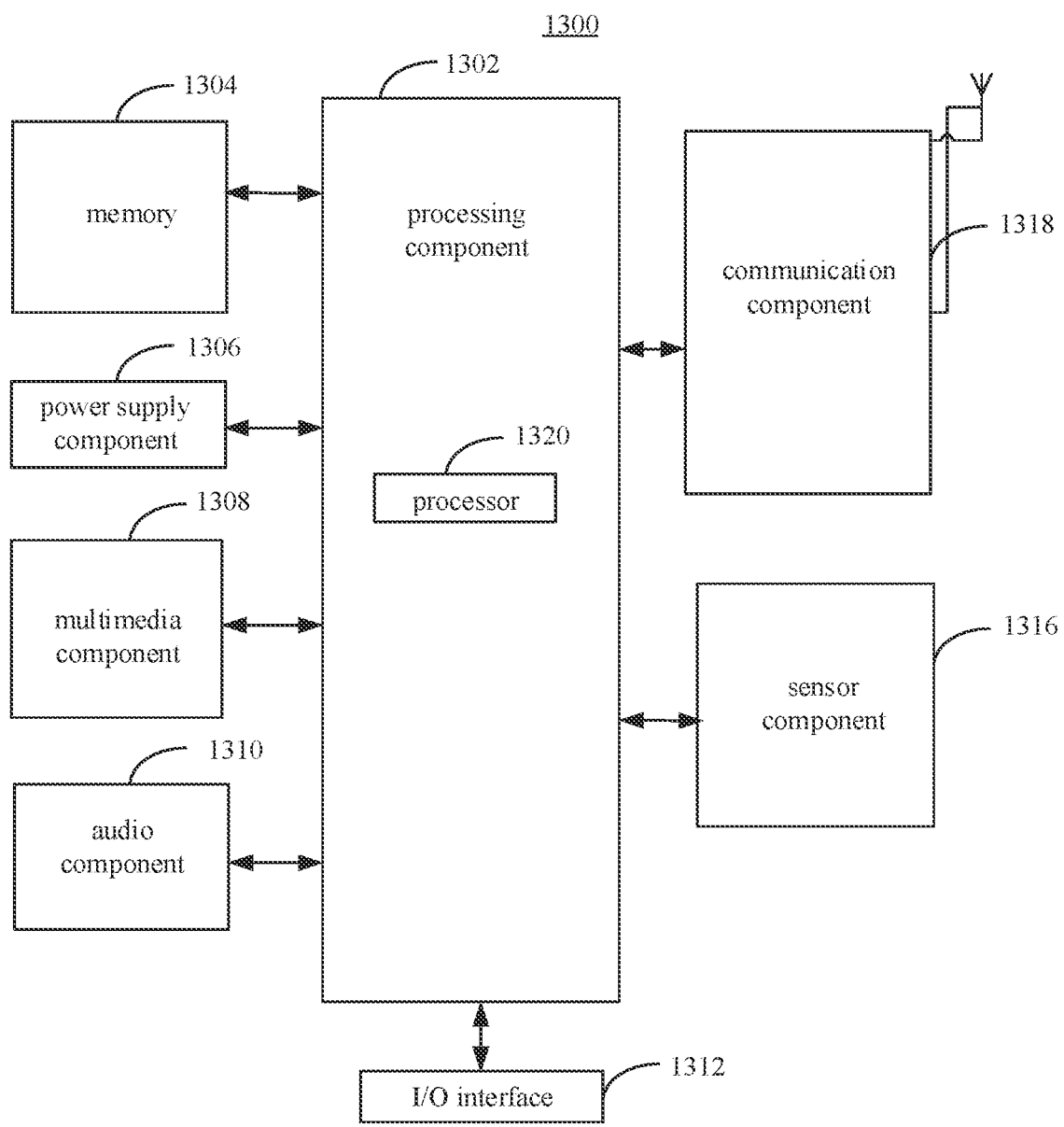
FIG. 13 is a diagram illustrating a structure of a paging device according to some emboli meats.

FIG. 13 is a block diagram illustrating an electronic device 100 according to some embodiments. For example, the electronic device 1300 may be a terminal including multiple SIMs such as a smart phone, a tablet, an e-book reader, a multimedia playback device, a wearable device, a vehicle-mounted terminal, an iPad, a smart TV, or the like.

As illustrated in FIG. 13, the electronic device 1300 may include one or more components: a processing component 1302, a memory 1304, a power supply component 1306, a multimedia component 1308, an audio component 1310, an input/output (I/O) interface 1312, a sensor component 1316, and a communication component 1318.

The processing component 1302 typically controls overall operations of the electronic device 1300, such as the operations associated with display, telephone calls, data communications, camera operations, and recording operations. The processing component 1302 may include one or more processors 1320 to execute instructions to perform all or part of the steps in the above described paging methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302. For another example, the processing component 1302 may read executable instructions from the memory, to implement the step of the paging method provided in the above each embodiment.

The memory 1304 is configured to store various types of data to support the operation of the electronic device 1300. Examples of such data include instructions for any applications or methods operated on the electronic device 1300, contact data, phonebook data, messages, pictures, video, etc. The memory 1304 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 1306 provides power to various components of the electronic device 1300. The power supply component 1306 may include a power management system, one or more power sources, and any other components associated with the generation, management, and distribution of power in the electronic device 1300.

The multimedia component 1308 includes a screen providing an output interface between the electronic device 1300 and the user. In some embodiments, the multimedia component 1308 includes a front camera and/or a rear camera. The front camera and the rear camera may receive an external multimedia datum while the electronic device 1300 is in an operation mode, such as a photographing mode or a video mode. Each of the front camera and the rear camera may be a fixed optical lens system or have focus and optical zoom capability.

The audio component 1310 is configured to output and/or input audio signals. For example, the audio component 1310 includes a microphone ("MIC") configured to receive an external audio signal when the electronic device 1300 is in an operation mode, such as a call mode, a recording mode, and a voice recognition mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a click wheel, buttons, and the like. The buttons may include, but are not limited to, a home button, a volume button, a starting button, and a locking button.

The sensor component 1314 includes one or more sensors to provide status assessments of various aspects of the electronic device 1300. For instance, the sensor component 1314 may detect an open/closed status of the electronic device 1300, relative positioning of components, e.g., the display and the keypad, of the electronic device 1300, a change in position of the electronic device 1300 or a component of the electronic device 1300, a presence or absence of user contact with the electronic device 1300, an orientation or an acceleration/deceleration of the electronic device 1300, and a change in temperature of the electronic device 1300. The sensor component 1314 may include a proximity sensor configured to detect the presence of nearby objects without any physical contact. The sensor component 1314 may also include a light sensor, such as a CMOS or CCD image sensor, for use in imaging applications. In some embodiments, the sensor component 1314 may also include an accelerometer sensor, a gyroscope sensor, a magnetic sensor, a pressure sensor, or a temperature sensor.

The communication component 1318 configured to facilitate communication, wired or wirelessly, between the electronic device 1300 and other devices. The electronic device 1300 can access a wireless network based on a communication standard, such as Wi-Fi, 2G, 3G, 4G, 5G, or 6G, or a combination thereof. In some embodiments, the communication component 1316 receives a broadcast signal or broadcast associated information from an external broadcast management system via a broadcast channel. In some embodiments, the communication component 1316 farther includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the electronic device 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described paging methods.

In some embodiments, there is also provided a non-transitory computer-readable storage medium including instructions, such as included in the memory 1304, executable by the processor 1320 in the electronic device 1300, for performing the above-described methods. For example, the non-transitory computer-readable storage medium may be a ROM, a RAM, a CD-ROM, a magnetic tape, a floppy disc, an optical data storage device, and the like.

Accordingly, a paging device is further provided in the disclosure, and includes: a processor; and a memory configured to store instructions executable by the processor; in which the processor is configured to perform the paging method described in any one of the core network side.

Figure 14:
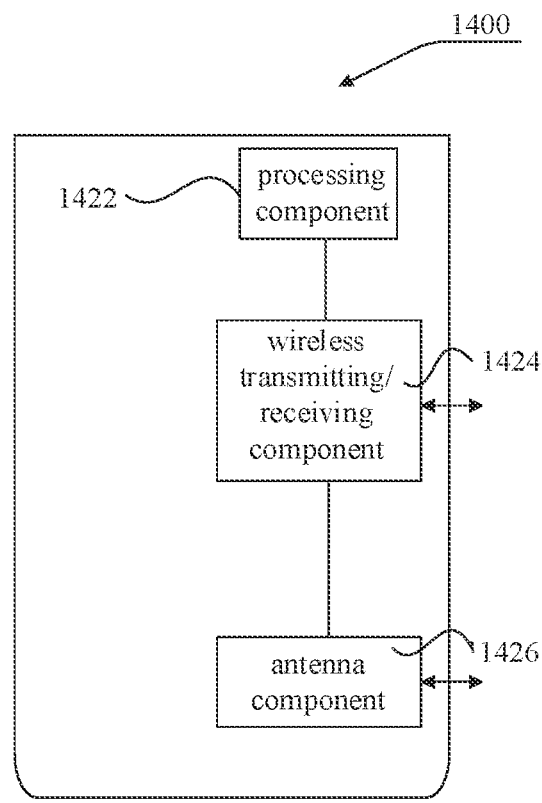
FIG. 14 is a diagram illustrating a structure of another paging device according to some embodiments.

As illustrated in FIG. 14, FIG. 14 is a diagram illustrating a structure of a paging device 1400 according to some embodiments. The device 1400 may be provided as the core network. As illustrated in FIG. 14, the device 1400 includes a processing component 1422, a wireless transmitting/receiving component 1424, an antenna component 1426, and a signal processing unit peculiar to a wireless interface, and the processing component 1422 may further include one or more processors.

One processor of the processing component 1422 may be configured to implement any one of the above paging methods at the core network side.

Accordingly, a paging device is further provided in the disclosure, and includes: a processor; and a memory configured to store instructions executable by the processor; in which the processor is configured to perform the paging method described in any one of the first base station or the second base station side.

Figure 15:
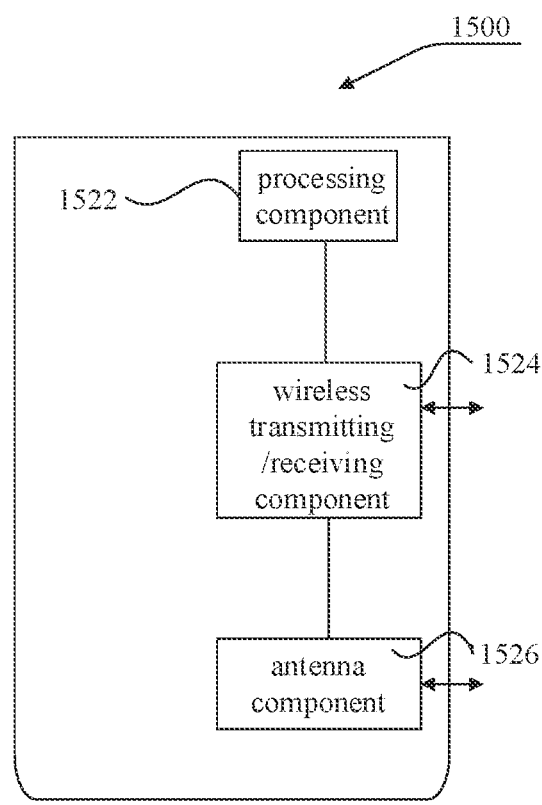
FIG. 15 is a diagram illustrating a structure of another paging device according to some embodiments.

As illustrated in FIG. 15, FIG. 15 is a diagram illustrating a structure of a paging device 1500 according to some embodiments. The device 1500 may be provided as the base station. As illustrated in FIG. 15, the device 1500 includes a processing component 1522, a wireless transmitting/receiving component 1524, an antenna component 1526, and a signal processing unit peculiar to a wireless interface, and the processing component 1522 may further include one or more processors.

One processor of the processing component 1522 may be configured to implement any one of the above paging methods at the first base station or the second base station side.

In an embodiment, a paging method is provided. The method is applicable to a terminal including multiple SIMs. The method includes: sending target indication information to a core network in response to determining that a paging collision exists at initial paging occasions of the multiple SIMs; in which the target indication information is configured to indicate that the paging collision exists; receiving a target paging offset value corresponding to a target SIM in the multiple SIMs; and determining, based on the target paging offset value, a target paging occasion for receiving by the target SIM a paging message.

In an embodiment, the method further includes: receiving, by the target SIM, the paging message from a first base station and/or at least one second base station in response to reaching the target paging occasion; in which the first base station is a last base station for serving the terminal before the terminal is switched to an inactive state, and the at least one second base station is a base station in a RAN-based notification area located by the target SIM.

In an embodiment, a paging method is provided. The method is applicable to a core network. The method includes: determining a target paging offset value corresponding to a target SIM in multiple SIMs, in response to receiving target indication information reported by a terminal including the multiple SIMs; in which the target indication information is configured to indicate that a paging collision exists; and sending the target paging offset value.

In an embodiment, the method further includes: sending a first paging message for paging the target SIM to a first base station in response to determining that the target SIM needs to be paged; in which the first paging message includes the target paging offset value, and the first base station is a last base station for serving the terminal before the terminal is switched to an inactive state.

In an embodiment, the first paging message includes a first information element for indicating the target paging offset value; or the first paging message includes a second information element, and the second information element includes a third information element for indicating the target paging offset value.

In an embodiment, a paging method is provided. The method is applicable to a first base station. The method includes: receiving a first paging message from a core network for paging a target SIM, in which the first paging message includes a target paging offset value corresponding to the target SIM.

In an embodiment, the method further includes: sending a second paging message for paging the target SIM to at least one second base station in response to determining that there is at least one second base station in a RAN-based notification area located by the target SIM; in which the second paging message includes the target paging offset value corresponding to the target SIM.

In an embodiment, the method further includes: determining a target paging occasion corresponding to the target SIM based on the target paging offset value included in the first paging message; and sending a paging message to the target SIM in response to reaching the target paging occasion.

In an embodiment, the first paging message includes a first information element for indicating the target paging offset value; or the first paging message includes a second information element, and the second information element includes a third information element for indicating the target paging offset value.

In an embodiment, the second paging message includes a fourth information element for indicating the target paging offset value; or the second paging message includes a fifth information element, and the fifth information element includes a sixth information element for indicating the target paging offset value.

In an embodiment, a paging method is provided. The method is applicable to a second base station. The method includes: receiving a second paging message from a first base station for paging a target SIM, in which the second paging message includes a target paging offset value corresponding to the target SIM; determining a target paging occasion corresponding to the target SIM based on the target paging offset value; and sending a paging message to the target SIM in response to reaching the target paging occasion.

In an embodiment, the second paging message includes a fourth information element for indicating the target paging offset value; or the second paging message includes a fifth information element, and the fifth information element includes a sixth information element for indicating the target paging offset value.

In an embodiment, a paging apparatus is provided. The apparatus is applicable to a terminal including multiple SIMs. The apparatus includes: a first sending module, configured to send target indication information to a core network in response to determining that a paging collision exists at initial paging occasions of the multiple SIMs; in which the target indication information is configured to indicate that the paging collision exists; a first receiving module, configured to receive a target paging offset value corresponding to a target SIM in the multiple SIMs; and a first determining module, configured to determine, based on the target paging offset value, a target paging occasion for receiving by the target SIM a paging message.

In an embodiment, the apparatus further includes: a second receiving module, configured to receive by the target SIM the paging message from a first base station and/or at least one second base station in response to reaching the target paging occasion; in which the first base station is a last base station for serving the terminal before the terminal is switched to an inactive state, and the at least one second base station is a base station in a RAN-based notification area located by the target SIM.

In an embodiment, a paging apparatus is provided. The apparatus is applicable to a core network. The apparatus includes: a second determining module, configured to determine a target paging offset value corresponding to a target SIM in multiple SIMs, in response to receiving target indication information reported by a terminal including the multiple SIMs; in which the target indication information is configured to indicate that a paging collision exists; and a second sending module, configured to send the target paging offset value.

In an embodiment, the apparatus further includes: a third sending module, configured to send a first paging message for paging the target SIM to a first base station in response to determining that the target SIM needs to be paged; in which the first paging message includes the target paging offset value, and the first base station is a last base station for serving the terminal before the terminal is switched to an inactive state.

In an embodiment, the first paging message includes a first information element for indicating the target paging offset value; or the first paging message includes a second information element, and the second information element includes a third information element for indicating the target paging offset value.

In an embodiment, a paging apparatus is provided. The apparatus is applicable to a first base station. The apparatus includes: a third receiving module, configured to receive a first paging message from a core network for paging a target SIM, in which the first paging message includes a target paging offset value corresponding to the target SIM.

In an embodiment, the apparatus further includes: a fourth sending module, configured to send a second paging message for paging the target SIM to at least one second base station in response to determining that there is at least one second base station in a RAN-based notification area located by the target SIM; in which the second paging message includes the target paging offset value corresponding to the target SIM.

In an embodiment, the apparatus further includes: a third determining module, configured to determine a target paging occasion corresponding to the target SIM based on the target paging offset value included in the first paging message; and a fifth sending module, configured to send a paging message to the target SIM in response to reaching the target paging occasion.

In an embodiment, the first paging message includes a first information element for indicating the target paging offset value; or the first paging message includes a second information element, and the second information element includes a third information element for indicating the target paging offset value.

In an embodiment, the second paging message includes a fourth information element for indicating the target paging offset value; or the second paging message includes a fifth information element, and the fifth information element includes a sixth information element for indicating the target paging offset value.

In an embodiment, a paging apparatus is provided. The apparatus is applicable to a second base station. The apparatus includes: a fourth receiving module, configured to receive a second paging message from a first base station for paging a target SIM, in which the second paging message includes a target paging offset value corresponding to the target SIM; a fourth determining module, configured to determine a target paging occasion corresponding to the target SIM based on the target paging offset value; and a sixth sending module, configured to send a paging message to the target SIM in response to reaching the target paging occasion.

In an embodiment, the second paging message includes a fourth information element for indicating the target paging offset value; or the second paging message includes a fifth information element, and the fifth information element includes a sixth information element for indicating the target paging offset value.

In an embodiment, a computer-readable storage medium with a computer program stored thereon is provided, in which the computer program is configured to perform any of the paging methods described above.

In an embodiment, a paging device is provided and includes: a processor; and a memory configured to store instructions executable by the processor; in which the processor is configured to perform any of the paging methods described above.

The technical solutions provided in embodiments of the disclosure may include the following beneficial effects.

In embodiments of the disclosure, the terminal including the multiple SIMs may send the target indication information to the core network in response to determining that the paging collision exists at the initial paging occasions of the multiple SIMs, and inform the core network that the paging collision exists, and the core network may determine the target paging offset value corresponding to the target SIM in the multiple SIMs based on the target indication information, and the terminal may determine, based on the target paging offset value, the target paging occasion for receiving by the target SIM the paging message, so that the paging message may be received at the target paging occasion, thereby avoiding that the paging collision exists among the multiple SIMs on the same terminal and having the high availability.

In embodiments of the disclosure, the core network may determine the target paging offset value corresponding to the target SIM in multiple SIMs and send the target paging offset value, in response to receiving the target indication information reported by the terminal including the multiple SIMs, and the terminal may determine, based on the target paging offset value, the target paging occasion for receiving by the target SIM the paging message. The paging collision among the multiple SIMs on the same terminal may be avoided, which has the high availability.

In embodiments of the disclosure, the core network may send the first paging message including the target paging offset value to the first base station in response to determining that the target SIM needs to be paged; in which the first base station is the last base station for serving the terminal before the terminal is switched to the inactive state. The first base station may determine the target paging occasion based on the target paging offset value, and send the paging message to the target SIM at the target paging occasion, which the paging collision among the multiple SIMs on the same terminal.

In embodiments of the disclosure, the first base station may receive the first paging message from the core network for paging the target SIM, in which the first paging message includes the target paging offset value corresponding to the target SIM. Further, the first base station may send the second paging message for paging the target SIM to at least one second base station in response to determining that there is at least one second base station in the RAN-based notification area located by the target SIM. The second paging message includes the target paging offset value. The second base station may determine the target paging occasion based on the target paging offset value, thereby sending the paging message to the target SIM. The paging collision among the multiple SIMs on the same terminal may be avoided while ensuring that the target SIM is paged.

In embodiments of the disclosure, the first base station as the last base station for serving the terminal before the terminal is switched to the inactive state, may determine the target paging occasion based on the target paging offset value included in the first paging message, in response to receiving the first paging message from the core network for paging the target SIM, thereby sending the paging message to the target SIM in response to reaching the target paging occasion. The paging collision among the multiple SIMs on the same terminal may be avoided.

Other embodiments of the disclosure will be apparent to those skilled in the art from consideration of the specification and practice of the disclosure disclosed herein. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A paging method, comprising:
sending, by a terminal comprising multiple subscriber identity modules (SIMs), target indication information to a core network in response to determining, by the terminal, that a paging collision exists at initial paging occasions of the multiple SIMs, wherein the target indication information is configured to indicate that the paging collision exists;
determining, by the core network, a target paging offset value corresponding to a target SIM of the multiple SIMs, in response to receiving the target indication information;
sending, by the core network, the target paging offset value to the terminal, and sending, by the core network, a first paging message for paging the target SIM to a first base station in response to determining that the target SIM needs to be paged, wherein the first paging message comprises the target paging offset value, and the first base station is a last base station for serving the terminal before the terminal is switched to an inactive state;
receiving, by the terminal, the target paging offset value;
receiving, by the first base station, the first paging message from the core network;
sending, by the first base station, a second paging message for paging the target SIM to at least one second base station, wherein the at least one second base station is in a RAN-based notification area located by the target SIM, and the second paging message comprises the target paging offset value corresponding to the target SIM;
receiving, by the at least one second base station, the second paging message from the first base station;
determining, by the first base station, a target paging occasion corresponding to the target SIM based on the target paging offset value comprised in the first paging message;
determining, by the at least one second base station, the target paging occasion corresponding to the target SIM based on the target paging offset value comprised in the second paging message;

determining, by the terminal, the target paging occasion for receiving a paging message by the target SIM based on the received target paging offset value;

sending, by the first base station and the at least one second base station, paging messages to the target SIM in response to reaching the target paging occasion; and receiving, by the terminal, the paging messages from the first base station and the at least one second base station through the target SIM in response to reaching the target paging occasion.

2. The method of claim 1, wherein the first paging message comprises a first information element for indicating the target paging offset value; or the first paging message comprises a second information element, and the second information element comprises a third information element for indicating the target paging offset value.

3. The method of claim 1, wherein the second paging message comprises a fourth information element for indicating the target paging offset value; or the second paging message comprises a fifth information element, and the fifth information element comprises a sixth information element for indicating the target paging offset value.

4. A paging system, comprising:

a terminal comprising multiple subscriber identity modules (SIMs);

a core network;

a first base station being a last base station for serving the terminal before the terminal is switched to an inactive state; and at least one second base station in a RAN-based notification area located by a target SIM of the multiple SIMs, wherein:

the terminal is configured to send target indication information to the core network in response to determining that a paging collision exists at initial paging occasions of the multiple SIMs, wherein the target indication information is configured to indicate that the paging collision exists, the core network is configure to determine a target paging offset value corresponding to the target SIM in response to receiving the target indication information, to send the target paging offset value to the terminal, and to send a first paging message for paging the target SIM to the first base station in response to determining that the target SIM needs to be paged, wherein the first paging message comprises the target paging offset value, the first base station is configured to receive the first paging message from the core network, and to send a second paging message for paging the target SIM to the at least one second base station, wherein the second paging message comprises the target paging offset value corresponding to the target SIM;

the first base station is further configured to determine a target paging occasion corresponding to the target SIM based on the target paging offset value comprised in the first paging message, and to send a paging message to the target SIM in response to reaching the target paging occasion;

the at least one second base station is configured to receive the second paging message from the first base station, to determine the target paging occasion corresponding to the target SIM based on the target paging offset value comprised in the second paging message, and to send a paging message to the target SIM in response to reaching the target paging occasion; and the terminal is further configured to determine the target paging occasion for receiving a paging message by the target SIM based on the received target paging offset value, and to receive the paging messages from the first base station and the at least one second base station through the target SIM in response to reaching the target paging occasion.

5. The system of claim 4, wherein the first paging message comprises a first information element for indicating the target paging offset value; or the first paging message comprises a second information element, and the second information element comprises a third information element for indicating the target paging offset value.

6. The system of claim 4, wherein the second paging message comprises a fourth information element for indicating the target paging offset value; or the second paging message comprises a fifth information element, and the fifth information element comprises a sixth information element for indicating the target paging offset value.

* * * * *